United States Patent [19]

Volland

[11] Patent Number: 5,545,327
[45] Date of Patent: Aug. 13, 1996

[54] WASTEWATER TREATMENT METHOD AND APPARATUS

[75] Inventor: Craig S. Volland, Kansas City, Kans.

[73] Assignee: Smith & Loveless, Inc., Lenexa, Kans.

[21] Appl. No.: 259,907

[22] Filed: Jun. 15, 1994

[51] Int. Cl.⁶ ........................................ C02F 3/06
[52] U.S. Cl. ..................... 210/615; 210/151; 210/620
[58] Field of Search ............................. 210/615, 150, 210/151, 521, 620

[56] References Cited

U.S. PATENT DOCUMENTS

| | | | |
|---|---|---|---|
| 758,484 | 4/1904 | Stewart. | |
| 1,946,414 | 2/1934 | Schmid | 260/144 |
| 2,207,399 | 7/1940 | Gaertner | 210/43 |
| 3,232,815 | 2/1966 | Quinn et al. | 210/615 |
| 3,235,234 | 2/1966 | Beaudoin | 261/24 |
| 3,346,122 | 10/1967 | Cornelissen | 210/522 |
| 3,347,381 | 10/1967 | Minch et al. | 210/150 |
| 3,402,103 | 9/1968 | Amberg et al. | 210/615 |
| 3,618,778 | 11/1971 | Benton et al. | 210/150 |
| 3,666,111 | 5/1972 | Pielkenrood et al. | 210/521 |
| 3,666,112 | 5/1972 | Pielkenrood et al. | 210/521 |
| 3,966,599 | 6/1976 | Burkhead | 210/14 |
| 3,966,608 | 6/1976 | Mason et al. | 210/151 |
| 3,972,965 | 8/1976 | Higgins | 261/91 |
| 4,028,256 | 6/1977 | Pielkenrood | 210/519 |
| 4,133,771 | 1/1979 | Pielkenrood | 210/513 |
| 4,190,543 | 2/1980 | Pederson et al. | 210/332 |
| 4,279,753 | 7/1981 | Nielson et al. | 210/605 |
| 4,344,845 | 8/1982 | Pielkenrood | 210/199 |
| 4,361,426 | 11/1982 | Carter et al. | 55/257 |
| 4,675,193 | 6/1987 | Nadudvari et al. | 210/150 |
| 4,680,111 | 7/1987 | Ueda | 210/615 |
| 4,732,713 | 3/1988 | Korsell | 261/112 |
| 5,122,266 | 6/1992 | Kent | 210/150 |
| 5,143,618 | 9/1992 | Hyun et al. | 210/615 |
| 5,217,788 | 6/1993 | Rye | 428/184 |
| 5,221,470 | 6/1993 | McKinney | 210/151 |
| 5,228,983 | 7/1993 | Nims | 210/151 |

FOREIGN PATENT DOCUMENTS

| | | |
|---|---|---|
| 209309 | 7/1957 | Australia. |
| 1098155 | 7/1955 | France. |
| 1210760 | 3/1960 | France. |
| 3816285 | 11/1989 | Germany. |
| 54-3366 | 11/1979 | Japan. |
| 2355344 | 6/1974 | Sweden. |
| 1557473 | 12/1979 | United Kingdom. |

OTHER PUBLICATIONS

Enviropax, Inc. Brochure, Jul. 1983.
Technical Information and Installation sheet for BIOdek Trickling Filter, BIOInstall.
Marley Cooling Tower Company, Pricing Sheets for Filter Media, May 1, 1992.
Marley Cooling Tower Company, Component Information on Cooling Tower Fill Brochure, Undated.
Aquamart, Inc. Bullentin AS824–1, AQUASEP Coalescing Plate Gravity Separator Systems, Undated.
Cytox Equipment Corp., Specification Sheet for Cytox Treatment Unit Model CTX–250, Undated.

*Primary Examiner*—Christopher Upton
*Attorney, Agent, or Firm*—Dressler, Goldsmith, Shore & Milnamow, Ltd.

[57] ABSTRACT

A method and apparatus for treatment of biodegradable waste products. The influent is aerated and directed through a fixed media assembly to promote intimate surface contact and cause microbial growth. The fixed media assembly comprises a stack of spaced apart, parallel, substantially vertical corrugated sheets. The corrugations are defined by obliquely inclined peaks and valleys and are oriented so that the corrugations of immediately adjacent sheets intermate with one another so as to define an inclined sluffing channel at each corrugation to provide a substantially unobstructed pathway therethrough while inducing turbulence and mixing.

13 Claims, 3 Drawing Sheets

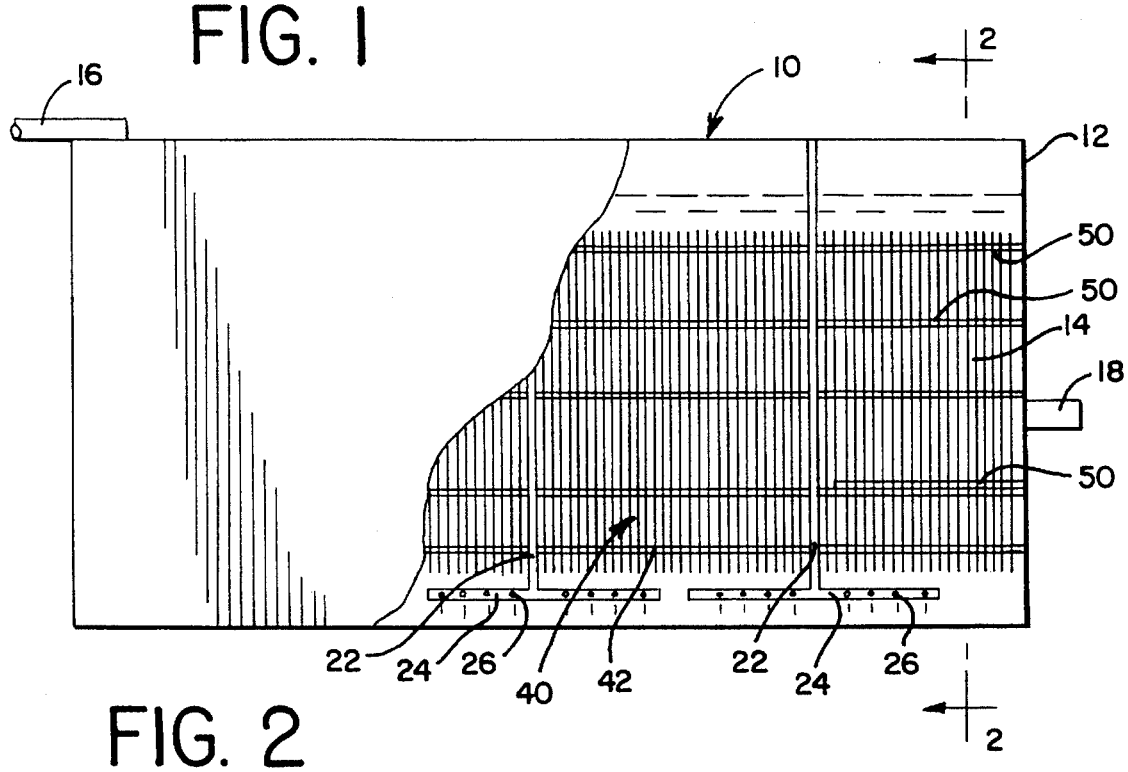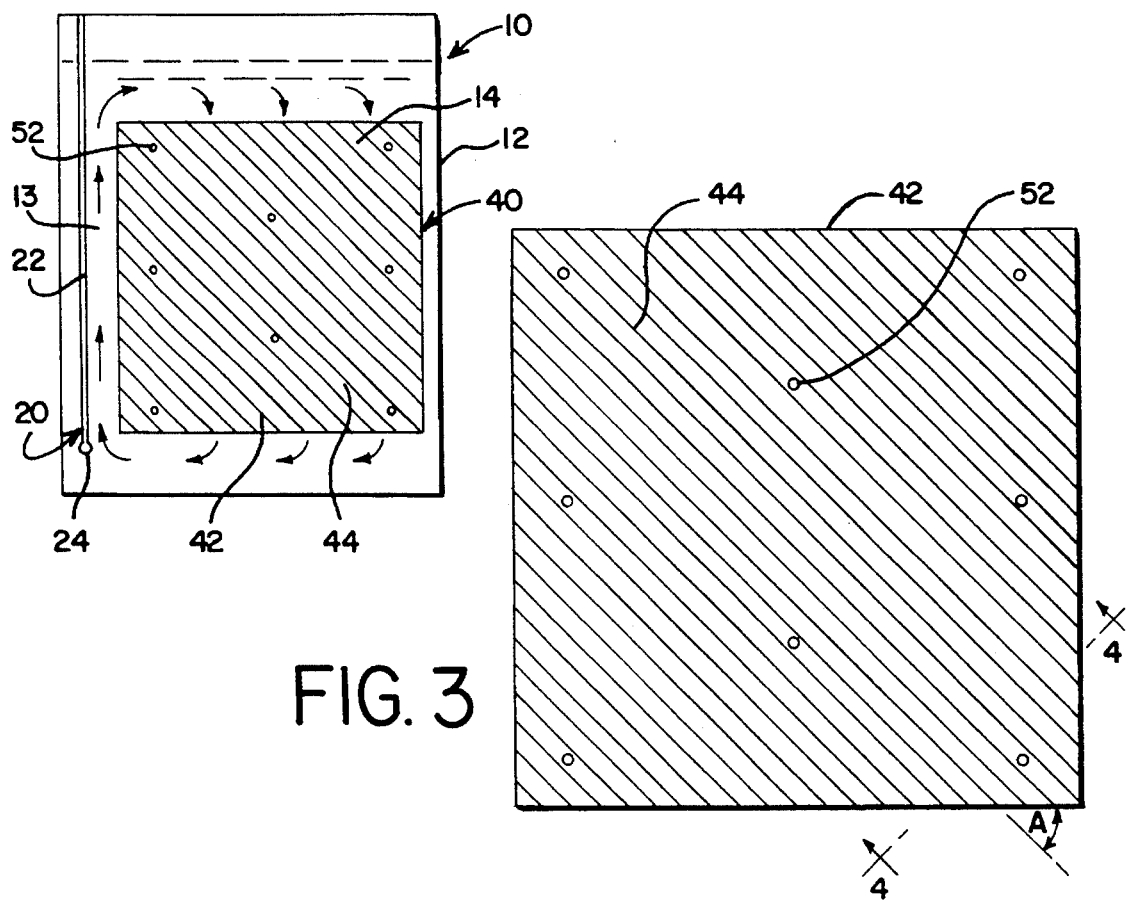

WASTEWATER TREATMENT METHOD AND APPARATUS

FIELD OF THE INVENTION

The present invention relates generally to the treatment of biodegradable waste products and, more particularly, is directed to a new and improved method and apparatus utilizing aerobic microbial growth on fixed media for biological oxidation of waste products.

BACKGROUND OF THE INVENTION

A wide range of methods and apparatus are known in the art for processing biologically degradable waste products to provide a clarified and safe effluent for return to nature.

Basically, biological sewage treatment is a process in which microorganisms metabolize waste products producing gaseous and soluble molecular end products, and additional bacterial cells. The rapidity and effectiveness of the process is aided by increasing the quantity of bacterial cells, or standing crop, available to carry out the metabolism. The concentrating and holding of the organisms in the system has in the prior art been obtained by one of several physical or biological techniques including flocculation, sedimentation and provision of large surface areas for bacterial multiplication.

Two widely known and conventional techniques for treating biodegradable waste products are the activated sludge and trickling filter processes. In an activated sludge system, contact of organisms with waste is brought about by mixing sewage with sludge, i.e., a concentrated solid containing flocs of organisms, to form the mixed liquor and then subjecting the mixture to strong agitation and the introduction of large volumes of air to improve oxygen transfer. In trickling filter systems, the biological organisms are not present in or submerged in an aqueous medium but are present in the form of exposed growth on the surface of suitable base objects in contact with the atmosphere and reaction is brought about by flowing the waste in relatively thin streams in direct contact with the biological slimes.

A submerged, attached biological wastewater treatment process is described in U.S. Pat. Nos. 3,966,599, 3,966,608 and 3,972,965, which patents are assigned to the assignee of the present invention. An integral feature of the submerged, attached growth, biological wastewater treatment process is the continual growth of organisms that periodically detach or "sluff off" the media surfaces. These clumps of biological solids are directed out of the treatment tank and are separated from the treated liquid by a subsequent clarification process. The media is designed to provide the maximum surface area for attached biological growth in a particular treatment tank volume, commonly referred to as the surface area density of a media, and to induce turbulence and mixing in liquid substrates carrying food, trace nutrients and oxygen to the organisms.

The aggregation of biomass within the media and its sluffing off of sheet surfaces are valuable characteristics because these relatively dense solids easily settle during the clarification step. However, these biomass aggregations tend to clog the media. A high surface density of the media is also a valuable characteristic because it will support a greater population of organisms that feed on waste. In general, a biological treatment process is rendered more stable and efficient when the food-to-micro-organism ratio is relatively low. Unfortunately, the combination of these two characteristics, maximum biological growth and high surface area density medias, often causes a problem with clogging.

Medias currently being used in this application include spaced apart, alternately reversed (criss-crossed) corrugated sheets. These medias create enclosed spaces subject to clogging and biomass occlusions when submerged in wastewater, particularly at the point at which the criss-crossed corrugations come into contact. These medias are aggregated in treatment tanks by stacking discrete blocks into a large and continuous pattern. The planes at which these blocks interface frequently cause additional clogging. Particularly in highly loaded treatment plants, where the thickness and profusion of attached biomass is relatively great, the clogging potential requires more open space within the media. This greater void volume reduces the overall surface area density of the media and the population of organisms that it can support.

Medias consisting of relatively large diameter conduits or tubular flow-through channels have also been adapted for the submerged, attached growth, biological wastewater treatment application. While these medias tend to solve the clogging problem, they typically fail to induce the turbulence and mixing required for the efficient operation of the mass transfer process. Such high void designs do not produce a high surface area density. Also, in a tube, the buildup of biomass inherently reduces the active surface area.

These enclosed medias may only be applied within a wastewater treatment process that uses a vertical flow circulation. As a result, the submerged attached growth process has not been combined with other common wastewater treatment processes, such as oxidation ditches having horizontal or "plug" flow regimes.

There is a need for improved medias that maximize surface area density within the treatment vessel while minimizing clogging from the biomass mass solids produced in the treatment process.

SUMMARY OF THE INVENTION

In accordance with a preferred embodiment of the invention, an improved fixed media assembly is provided for use in a biological wastewater treatment process that comprises a stack of interconnected, parallel corrugated sheets. The sheets are spaced apart in a substantially vertical orientation. The corrugations are defined by obliquely inclined peaks and valleys and are oriented so that the corrugations of immediately adjacent sheets intermate with one another in a juxtaposed relationship. The angle of inclination of the corrugations with respect to a horizontal plane is preferably from about 5° to about 75°, more preferably from about 30° to about 60°, and most preferably about 45°, so as to define a sluffing channel between intermating corrugations to provide a substantially unobstructed pathway for the passage of solids therethrough while at the same time inducing turbulence and mixing. The openness of the media assembly provides improved oxygen transfer to the wastewater.

In accordance with a preferred embodiment of the invention, the stack is supported from a plurality of spaced apart support rods that extend through horizontal aligned openings in the sheets. The sheets are spaced apart by spacer tubes that are concentric with the rods and extend between immediately adjacent sheets. Alternatively, the sheets may be spaced apart by molded protrusions that extend from the surface of the sheet. The sheets are preferably separated by a nominal separation distance (peak to peak of the corrugations) preferably from about 0.625 inches to about 3.0 inches, more preferably from about 1.0 inches to about 1.375 inches, and most preferably 1.1875 inches.

It is anticipated that one or more of such stacks may be supported within the reaction zone of a treatment tank.

BRIEF DESCRIPTION OF THE DRAWINGS

The invention, its construction and method of operation, will be best understood by reference to the following detailed description, taken in conjunction with the drawings, in which:

FIG. 1 is a side elevational view, partially broken away, of an exemplary wastewater treatment system incorporating the fixed media assembly of the present invention;

FIG. 2 is a sectional view taken along line 2—2 in FIG. 1;

FIG. 3 is an enlarged elevational view of the fixed media assembly;

DESCRIPTION OF PREFERRED EMBODIMENTS

Figure 4:
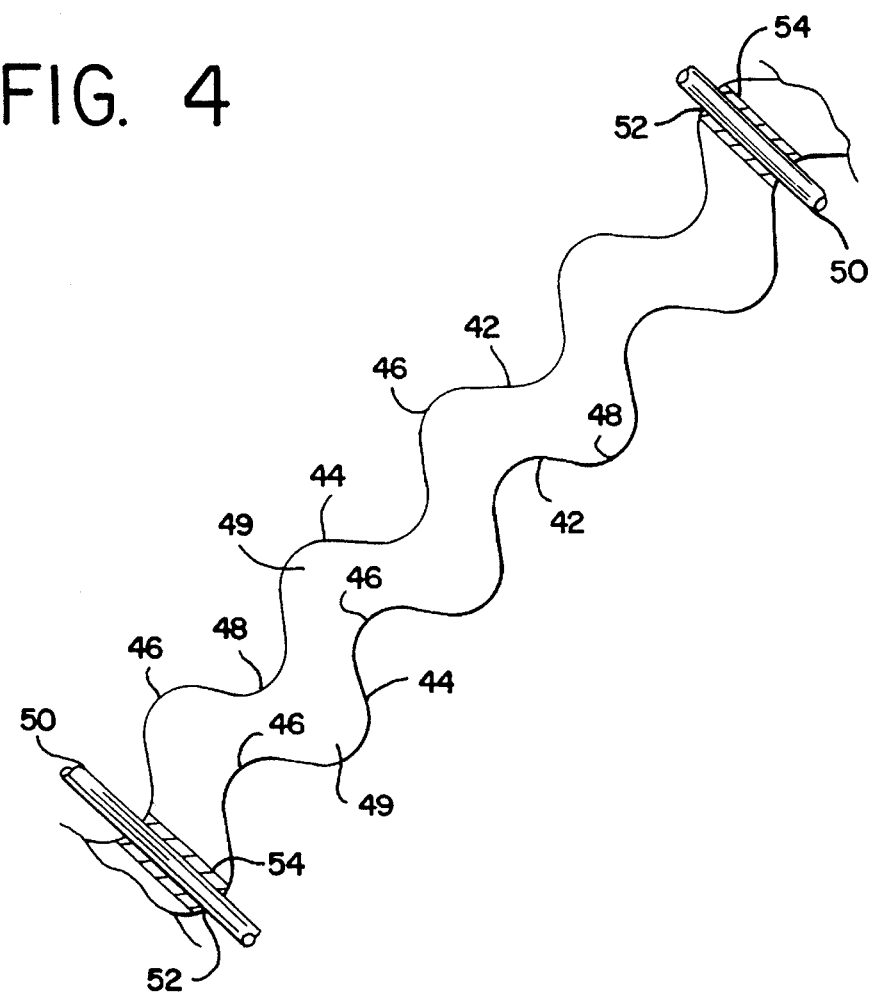
FIG. 4 is an enlarged sectional view taken along line 4—4 in FIG. 3 showing portions of two immediately adjacent sheets.

Referring to FIGS. 1 and 2, an exemplary biological wastewater treatment apparatus incorporating the improved fixed media assembly of the present invention is generally indicated by the reference numeral 10. Apparatus 10 includes a treatment tank 12 within which is disposed a reactor zone 14. In the embodiment shown, the tank 12 has a rectangular cross-sectional configuration when viewed from the top. Of course, such a shape is not critical, and other cross-sectional configurations may be employed. The tank 12 is provided with an inlet pipe 16 communicating with an upper portion for directing untreated wastewater into tank 12. The level of wastewater in tank 12 is maintained by a weir located in a downstream clarification apparatus (not shown) in a well known manner. The treated effluent exits tank 12 through an effluent pipe 18.

A suitable aerator system 20 is provided in tank 12 which functions to aerate, distribute and circulate the wastewater in tank 12. The aerator system may take alternate forms. The aerator system 20 as shown in FIGS. 1 and 2 includes a plurality of downwardly extending supply pipes 22, in communication with a source of pressurized air (not shown), and a diffuser manifold pipe 24 in communication with each supply pipe. Pipes 24 have diffuser openings or nozzles 26 for diffusing air into the wastewater at a lower portion of the tank 12 in a manner which will herein become more apparent.

A fixed media assembly 40 constructed in accordance with the invention is located in the reactor zone 14. Referring to FIGS. 1–4, fixed media assembly or stack 40 consists of a plurality of parallel rectangular media sheets 42. As best seen in FIG. 4, sheets 42 have a plurality of parallel corrugations 44 formed therein that are defined by obliquely inclined peaks 46 and valleys 48. The corrugations 44 of immediately adjacent sheets are oriented with respect to one another so that the peaks and valleys intermate with one another in a juxtaposed relationship. For reasons which will become more apparent, the corrugations preferably have an angle of inclination (A in FIG. 3) of from about 5° to about 75°, more preferably from about 30° to about 60° and most preferably about 45°.

The sheets 42 may be fabricated from any suitable materials, such as polyethylene terephthalate or polyvinyl chloride plastic.

The fixed media assembly is supported within the reactor zone 14 from a plurality of substantially horizontal support rods 50 that extend across tank 12. The support rods 50 extend through cooperating openings 52 formed in the sheets 42. The sheets are separated by a plurality of spaced apart, substantially horizontal, spacer members 54 that extend between adjacent sheets. As best seen in FIG. 4, the spacer members 54 are tubular members that are concentric with the support rods 50. For reasons which will become more apparent, the sheets 42 are preferably separated by a distance of from about 0.625 inches to about 3.0 inches, more preferably from about 1.0 inches to about 1.375 inches, and most preferably about 1.1875 inches. The fixed media assembly is spaced a distance from the side wall of tank 12 so as to define a circulation zone 13.

The features of the fixed media assembly 40 constructed in accordance with the invention will become more apparent from the following discussion of the operation of apparatus 10. Wastewater containing biodegradable wastes, generally in both dissolved and undissolved forms, is delivered to tank 12 through the inlet pipe 16. The wastewater is circulated and aerated in tank 12 by the aerator system 20 in a well known manner. As depicted by the arrows in FIG. 2, the wastewater is directed vertically upwardly through circulation zone 13 adjacent reactor zone 14 and then vertically downwardly in reactor zone 14 between the sheets 42. As the wastewater is recirculated downwardly through the fixed media assembly 40 it is aerobically digested by the microorganisms on the surfaces of the sheets 42.

The corrugations 44 in the sheets 42 induce turbulence in the wastewater as it passes between the sheets ensuring mixing and intimate contact of nutrients and air with the biological growth on the sheets. This turbulence may also assist in the process whereby solid particles sluff off the growing biomass fill. The openness of the media assembly provides improved oxygen transfer to the wastewater. It is a characteristic of intermating corrugated sheets that the minimum spacing distance between sheets is less than the nominal separation distance of the intermated sheets. This narrowing of the passageway is one of the factors that induces turbulence, but also increases the tendency of the media to obstruct the passage of solids that may be present in the process liquid. In accordance with the invention, the corrugations 44 are formed at an oblique angle in order to provide "sluffing channels" 49. The solid particles are carried by the wastewater through clog relieving sluffing channels 49 formed by and between the sheets at every corrugation. The solid particles are carried out of the fixed media assembly 40 and sink toward the bottom of tank 12 from where they are recirculated. It is not necessary for the solids to escape the media assembly in order for the clog to be relieved. In many instances, the solid particle clump may be moved down the inclined sluffing channel a short distance until it breaks up into smaller pieces that resume a vertical pathway with the main body of wastewater flow.

The effluent from tank 12 is directed through pipe 18 for further clarification in a well known manner.

Figure 5:
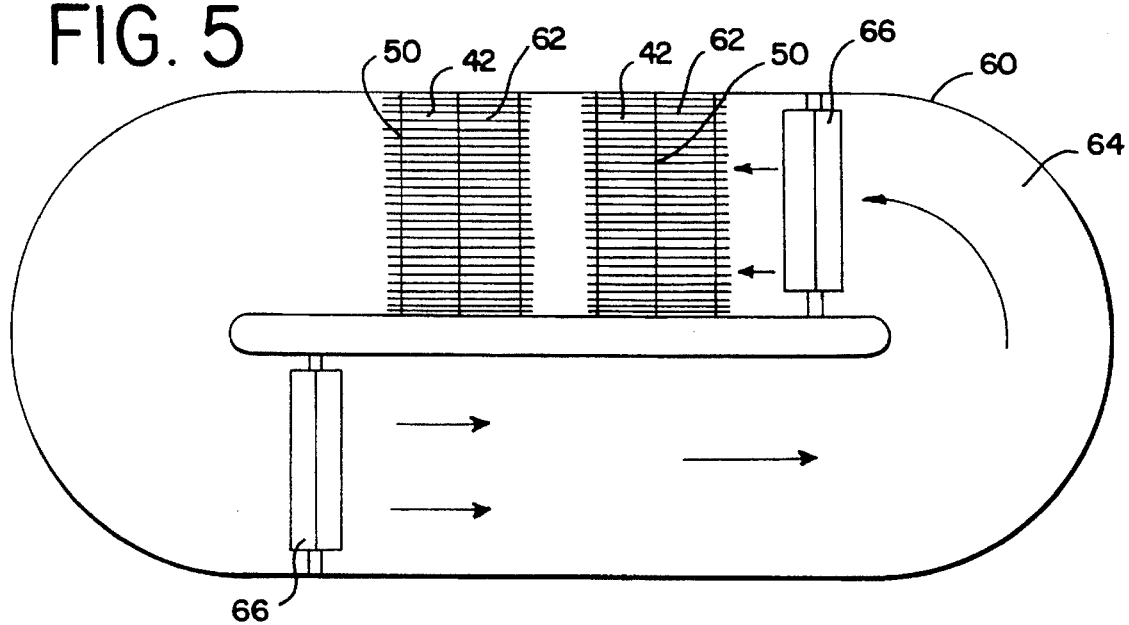
FIG. 5 is a schematic top plan view of another exemplary wastewater treatment system incorporating the fixed media assembly of the present invention.

Referring to FIG. 5, there is disclosed an exemplary wastewater treatment oxidation ditch 60 incorporating a fixed media assembly 62 constructed in accordance with the invention. As is well known, oxidation ditches with horizontal or "plug" flow regimes, typically include a tank defining a racetrack-shaped channel 64 having one or more aerator systems 66, such as paddle-type surface aerators, for inducing air into and circulating the wastewater. One or more fixed media assemblies 62 may be positioned across the channel 64. The fixed media assemblies are fabricated from sheets 42 which are supported from support rods 50 in a similar manner as discussed above. It is preferred that the angle of inclination of the corrugations 44 in sheets 42 be about 45° so that the clog relieving sluffing channel will serve the same function with the horizontal flow through the fixed media assemblies.

Figure 6:
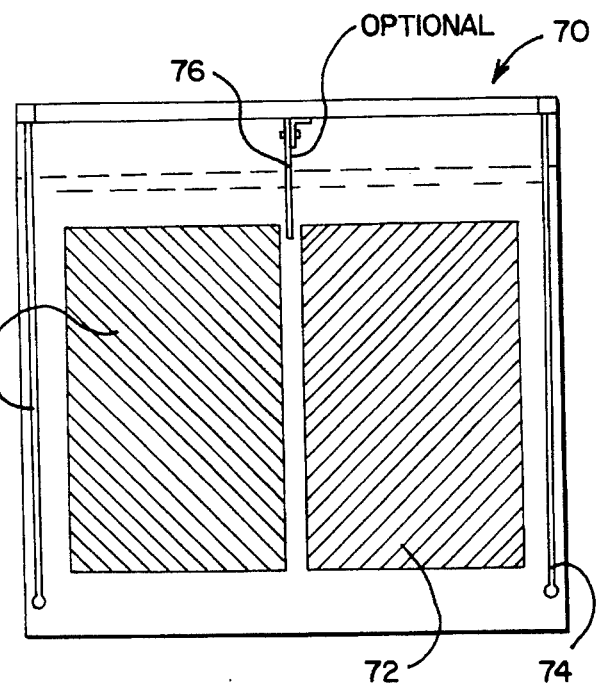
FIG. 6 is a sectional view similar to FIG. 2 taken through a further exemplary wastewater treatment system incorporating the fixed media assembly of the present invention.

Referring to FIG. 6, there is disclosed another exemplary biological wastewater treatment apparatus 70 incorporating a plurality of fixed media assemblies 72 constructed in accordance with the invention. Apparatus 70 is of similar construction and operation as apparatus 10 and the above discussion of apparatus 10 is applicable to apparatus 70. Apparatus 70 includes a plurality of fixed media assemblies 72 spaced a short distance apart from one another and an aerator system 74 associated with each of the fixed media assemblies. A downwardly extending baffle plate 76 may optionally be provided to prevent flow originating from one side of the tank from going beyond the center line and interfering with the flow pattern on the other side.

Figure 7:
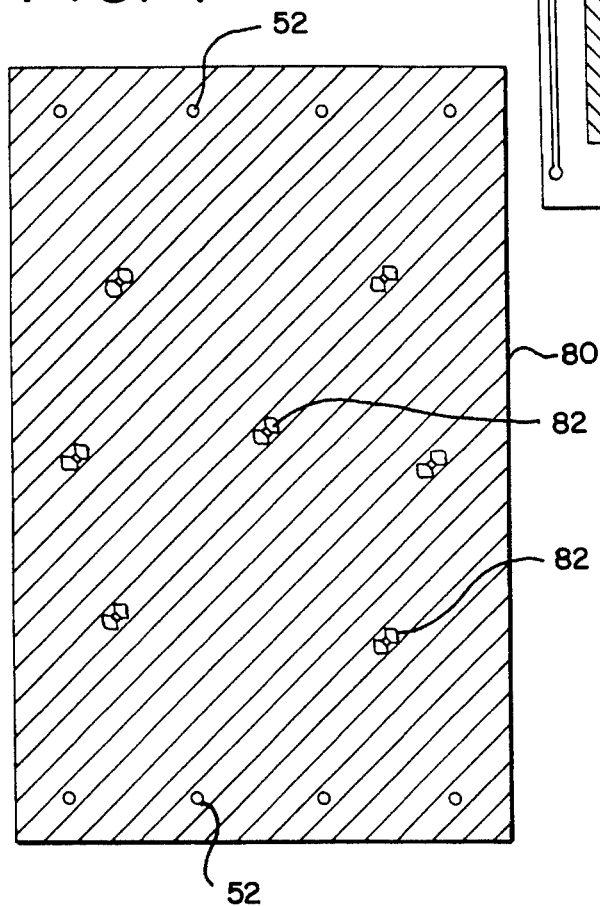
FIG. 7 is an elevational view of an alternative embodiment of a sheet for use in a fixed media assembly of the present invention.
Figure 8:
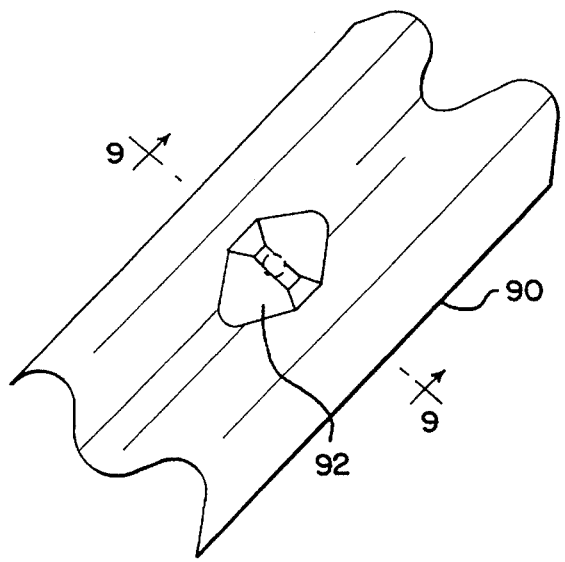
FIG. 8 is an enlarged elevational view of a portion of the mold used to form the sheet shown in FIG. 7.
Figure 9:
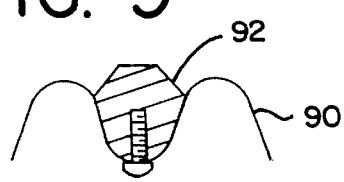
FIG. 9 is a sectional view taken along line 9—9 in FIG. 8.

Referring to FIG. 7, there is disclosed an alternative embodiment of the fixed media sheets of the present invention indicated by the reference numeral 80. Sheets 80 are designed so that a single sheet need be formed which can be shipped nested, but, when rotated 180° during assembly, will be spaced apart from an immediately adjacent sheet. In order to facilitate disclosure of sheet 80, the common structural elements of sheets 42 and 80 are indicated by the same reference numeral. Sheet 80 is provided with a plurality of spaced apart openings 52 formed at the top and bottom of the sheet. A plurality of spacer protrusions 82 are molded into the valleys of the corrugations. The spacer protrusions are located and shaped with a gradual slope up from the valleys so that nesting of the sheets for stacking and shipping can be attained. Referring to FIGS. 8 and 9, there is shown a portion of an exemplary mold 90 that is provided with an insert 92 for forming the spacer protrusions 82.

It is contemplated that the improved fixed media assembly in accordance with the present invention may be utilized in alternative biological treatment systems. For example, the fixed media assembly may be used in treatment systems that include mechanical aeration of the type generally shown in U.S. Pat. Nos. 3,966,599, 3,966,608 and 3,972,965, the disclosure of which patents are incorporated herein by reference. Alternatively, the fixed media assembly may be used in treatment systems that utilize air lift pumps or fine bubble aeration techniques to aerate and circulate wastewater.

While particular embodiments of the present invention have been shown and described, it is apparent that various changes and modifications may be made, and it is therefore intended in the following claims to cover all such modifications and changes as may fall within the true spirit and scope of the invention.

What is claimed is:

1. In an apparatus for treating an influent containing biologically degradable waste products to produce a clarified effluent, said apparatus including a treatment tank having an influent inlet, a reactor zone disposed within the treatment plant, a fixed media assembly located in the reactor zone, an aerator assembly disposed in the tank that introduces air into the influent and directs the influent through the fixed media assembly, and an outlet for withdrawing effluent from the treatment tank; an improved fixed media assembly comprising: a plurality of spaced apart substantially vertical parallel sheets; said sheets having a plurality of parallel corrugations formed therein that are defined by obliquely inclined peaks and valleys, said corrugations of immediately adjacent sheets being oriented with respect to one another so that the peaks and the valleys of one sheet intermate with the respective peaks and valleys of the adjacent sheets, said corrugations having an angle of inclination with respect to a horizontal plane of from about 5° to about 75° so as to define an open sluffing channel at each corrugation that provides a substantially unobstructed pathway for the passage of solids toward the bottom of the treatment tank.

2. The invention as defined in claim 1 wherein said angle of inclination is from about 30° to about 60°.

3. The invention as defined in claim 2 wherein said angle of inclination is about 45°.

4. The invention as defined in claim 1 wherein said sheets are separated by a plurality of spaced apart, substantially horizontal, spacer members extending between adjacent sheets.

5. The invention as defined in claim 4 wherein said spacer members are tubes.

6. The invention as defined in claim 4 wherein said spacer protrusions are molded protrusions that extend from the surface of said sheets.

7. The invention as defined in claim 1 wherein said sheets are separated by a nominal peak to peak distance of from about 0.625 inches to about 3.00 inches.

8. The invention as defined in claim 7 wherein said sheets are separated by a nominal peak to peak distance of from about 1.0 inches to about 1.375 inches.

9. The invention as defined in claim 1 wherein said fixed media assembly comprises a stack of said sheets that is supported in the reactor zone from a plurality of spaced apart support members that extend through horizontally aligned openings in said sheets.

10. The invention as defined in claim 9 wherein support members are rods and said sheets are separated by spacer tubes that are concentric with said rods.

11. The invention as defined in claim 9 wherein at least two of said stacks of sheets are positioned adjacent one another in the reactor zone.

12. The invention as defined in claim 11 wherein a baffle member extends downwardly into the reactor zone through a vertical plane between said stacks of sheets.

13. A method for treating a wastewater influent containing biodegradable waste products, comprising:

introducing the wastewater influent into a treatment tank having a reactor zone disposed therein that contains a fixed media assembly located therein, said fixed media assembly including a plurality of substantially vertical parallel sheets, said sheets having a plurality of parallel corrugations formed therein that are defined by obliquely inclined peaks and valleys, said corrugations of immediately adjacent sheets being oriented with respect to one another so that the peaks and valleys of one sheet intermate with the respective peaks and valleys of the adjacent sheets so as to define an inclined open sluffing channel at each corrugation that provides a substantially unobstructed pathway for the passage of solids toward the bottom of the treatment tank;

aerating the wastewater within the treatment tank;

circulating the wastewater through the fixed media assembly to promote intimate contact with the sheets to cause microbial growth on the sheets; and directing said particles that dislodge from the surfaces of the sheets through the sluffing channels toward the bottom of the treatment tank.

* * * * *